United States Patent

[11] 3,611,277

[72] Inventor Max N. Yoder
 Washington, D.C.
[21] Appl. No. 820,405
[22] Filed Apr. 30, 1969
[45] Patented Oct. 5, 1971
[73] Assignee The United States of America as
 represented by the Secretary of the Navy

[54] SENSITIVE HYDROPHONE
 5 Claims, 1 Drawing Fig.

[52] U.S. Cl. .................................................. 340/14,
 250/199, 356/5
[51] Int. Cl. ............................................... G01v 1/00
[50] Field of Search .................................... 181/.5 B;
 331/94.5; 250/199; 340/14

[56] References Cited
 UNITED STATES PATENTS
3,175,088 3/1965 Herriott ....................... 250/199
3,373,401 3/1968 Bayer ........................... 331/94.5 X OTHER REFERENCES
 Foster, A Laser Device for Remote Vibration Measurement, IEEE Transactions on AES, March 1967, Vol. AES-3 02 pp. 154– 157 181/.5 B
 Honig, Laser Benioff Strain Seismometer, Proc. IEEE, Vol. 53, No. 1 331– 94.5

Primary Examiner—Rodney D. Bennett, Jr.
Assistant Examiner—Joseph G. Baxter
Attorneys—R. I. Tompkins, L. I. Shrago and R. K. Tendler ABSTRACT: An optically interrogated acoustic ASW surveillance system is disclosed in which a laser beam is used to illuminate floating acoustic transducers. These transducers have beam-splitting optics and a submerged monocrystalline diaphragm which modulates one portion of the split beam in response to acoustic signals arriving through the water. When this portion of the beam is colinearly recombined with the unmodulated portion of the split beam, an amplitude-modulated light signal is produced which is directed back to and detected at the laser source.

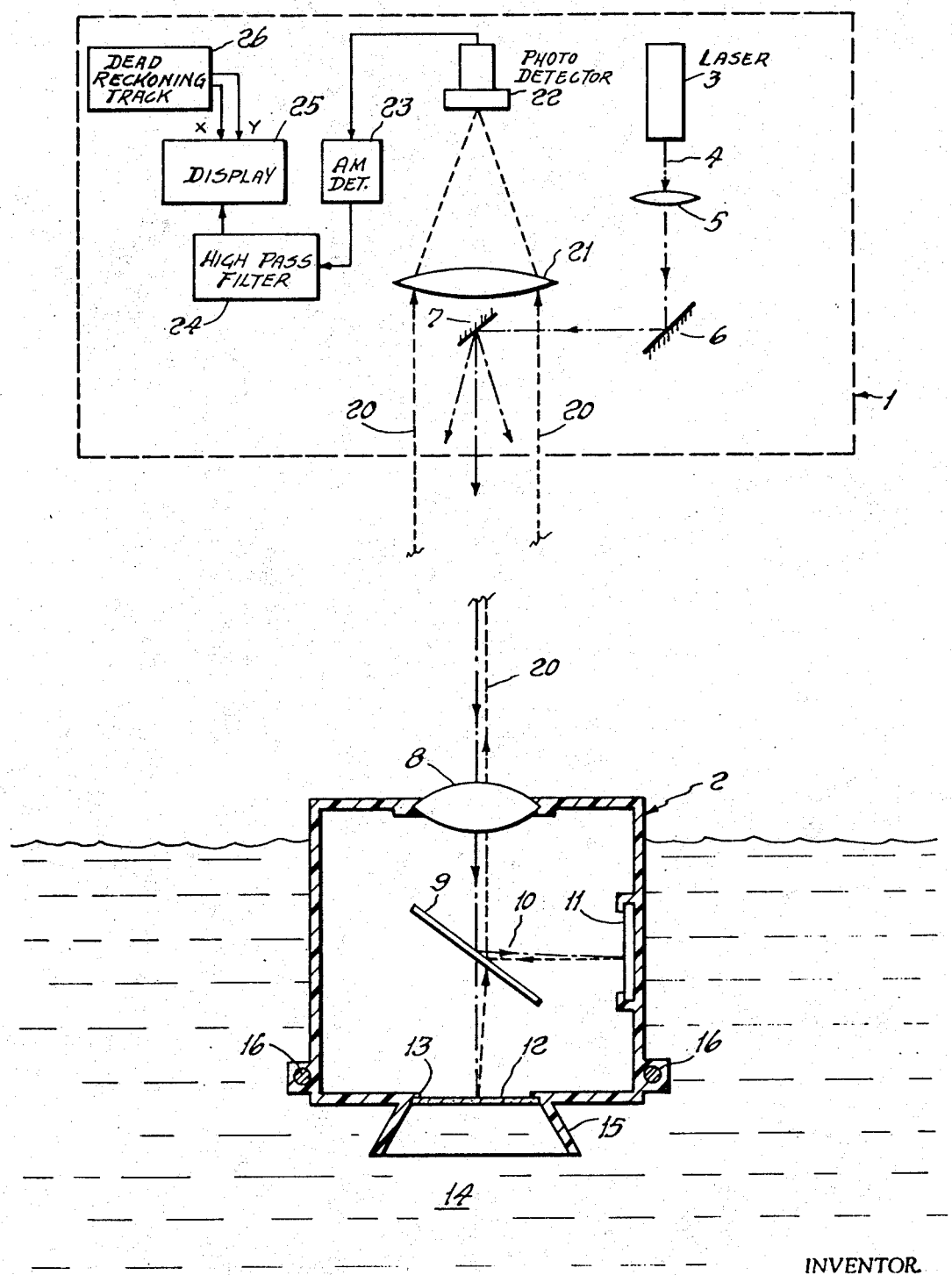

SENSITIVE HYDROPHONE

The invention described herein may be manufactured and used by or for the Government of the United States of America for governmental purposes without the payment of any royalties thereon or therefor.

This invention relates to passive floating hydrophones deployed on the ocean surface for antisubmarine warfare surveillance and, more particularly, to a laser-interrogated, acoustic transducer which is sensitive to low-level subsurface acoustic radiation in the ocean.

The surveillance of large portions of the ocean by a multiplicity of acoustic detectors scattered over a large area has suffered primarily from the cost and complexity of the equipment necessary to provide acoustic information. Self-powered modules have been developed which provide radio signals indicating subsurface acoustic activity. These modules have a relatively short lifetime and cannot be deployed in great numbers because of their cost. In addition, these devices require operation from a relatively stable platform which is difficult to achieve at sea. The present device is a low-cost, nonstabilized passive acoustic sensor which is illuminated with a laser beam. It is possible to deploy hundreds of these low-cost devices over a given area of the ocean and to sample these devices periodically by overflying them. The overflights may be carried out periodically by helicopter, blimp or by slow-moving aircraft. On board this aircraft is a laser-transmitting system and a system which detects reradiated light from the passive floating modules.

The module itself is a free-floating device which requires no internal source of power. In its operation, monochromatic radiation from the laser which impinges on this device is optically split. One portion of this beam is reflected back to the beam-splitting device by a fixed mirror. The other portion of the split beam is modulated by a crystalline diaphragm which has a side exposed to the aqueous medium. Movement of this diaphragm due to the arrival of subsurface acoustic energy varies the path length for this portion of the split beam. This portion of the beam is redirected back through the beam-splitting device and is combined colinearly with the other portion of the beam to provide a phase-modulated return beam. This phase modulation produces an amplitude modulation of the intensity of the beam returned and when detected by a photodetector produces an amplitude-modulated signal. The modulation is dependent upon the flexure of the aforementioned diaphragm. Displacement of the diaphragm by only 5.3A. in response to a longitudinally polarized sound signal modulates the return beam at a level of 5.3/5,300 with a laser frequency output wavelength of 5,300A. This represents 0.1 percent of the amplitude of the return beam or a 30-db modulation of the signal. Low frequency components of the return signal due to the heave, pitch and roll of the module are filtered from the output of the photodetector by a conventional high-pass filter so that only acoustic energy is measured by the subject system.

It is therefore an object of this invention to provide an optically interrogated acoustic transducing system for use in the detection of undersea propagated acoustic energy.

It is a further object of this invention to provide a sensitive acoustic passive floating transducer which is interrogated by a monochromatic beam of light.

It is another object of this invention to provide a passive, low-cost acoustic transducing module for deployment at spaced points on the surface of the ocean.

It is a still further object of this invention to provide a semisubmerged passive acoustic transducing unit having an optical beam-splitting device and means in contact with the surrounding aqueous medium for modulating one of the split beams.

Other objects, advantages and novel features of the invention will become apparent from the following detailed description thereof when considered in conjunction with the accompanying drawing.

The single drawing represents a passive acoustic transducing system in which the transmitting and receiving unit is designated by the dotted box 1 and transducing unit by housing 2. The transmitting unit which may be conveniently carried within a helicopter or slow-moving aircraft contains a CW laser 3 which in the preferred embodiment lases at 1.06 microns and is frequency doubled to 0.53 micron. Beam 4 from laser 3 which is passed through suitable focusing optics 5 is redirected by a planar mirror 6 and again by another planar mirror 7 which forms a portion of the receiving optics. This monochromatic beam is directed downwardly so as to scan across the surface of the ocean with the movement of the aircraft. When this beam impinges on wide-angle lens 8 of any one of the floating modules, it is directed towards a half-silvered mirror 9 within housing 2. This mirror splits the incoming beam and a portion 10 is directed at right angles towards one of the walls of the housing. This beam impinges upon a planar mirror 11 affixed to this wall and is redirected back along the same path 10 to the half-silvered mirror. The redirected and split portion of the beam is then reflected back colinearly along the axis of the incoming beam through lens 8. The other portion of the split beam continues along the incoming axis through half-silvered mirror 9 and impinges upon a monocrystalline diaphragm 12. This diaphragm is mounted at an orifice defined by walls 13 of the housing such that the lower face of this diaphragm is exposed to sea water diagrammatically shown at 14 to surround a portion of housing 2. The aforementioned beam is reflected back by the top surface of the crystalline material. This crystalline material may be coated so as to be optically reflective at the wavelength of the monochromatic light used. The crystalline material when highly polished may also serve as a reflector for this light. Incoming acoustic energy is focused onto the lower side of this diaphragm by cone 15 so as to maximize the effect of acoustic radiation on the diaphragm.

The monocrystalline diaphragm is made as thin as possible while still retaining a maximum of rigidity or Rockwell hardness. This crystalline diaphragm in one embodiment may be either silicon or quartz. Because of the extremely hard nature of these materials, the diaphragm in this configuration is affixed to housing 2 with a soft resilient material (not shown) interspersed between the upper edge of the diaphragm and housing lip 13. The size of the orifice in the housing is determined to be some fraction of the wavelength of the center frequency of the transducer so as to produce a maximum amount of resonance of the diaphragm to the signals to be detected. It will be appreciated that this transducer is basically a low Q, broad-bandwidth system. Its main function is to provide an indication of subsurface acoustic activity which may contain a broad spectrum of acoustic frequencies.

Moreover, it will be appreciated that while in the preferred embodiment this transducing device functions as an indicator of the presence of acoustic signals it is possible to extract spectral information from the return beam. Acoustic impedance transformers can be placed on the bottom of the diaphragm to reduce the acoustic bandwidth of the acoustic transducer and optimize the response of the device for acoustic signals of a predetermined frequency range.

Housing 2 is kept in an upright position by enclosed weights 16. The unitary construction shown in the diagram is preferable to maintain the buoyancy of the entire structure. Weights 16 may be positioned within the housing both to act as a self-righting device and for acoustic damping of the lower surface of the module.

The wide-angle lens used with this module is necessary so that laser beams which are not directly above the module can be modulated. The use of this wide-angle lens thus precludes the necessity for stabilizing the entire module. Since the optical paths between the half-silvered mirror and both the fixed mirror 11 and the diaphragm 12 are relatively constant and of approximately the same length, sea motions will not effect the phase-modulated signal returned by the module. Since the reflected beam from the module is returned colinear with the transmitted beam, the exact position of the module can be determined if the direction of the transmitted beam is known. This return beam is shown as dotted line 20. Because of the colinearity of the two components of this return beam, amplitude modulation occurs through optical mixing. The return beam 20 is shown entering focusing optics 21. These optics focus the beam onto a conventional photodetector 22 which acts as a summation device. Since the electric field polarity for both the components of the return beam are in the same direction, a phase cancellation takes place which creates an effective amplitude modulation of the return beam at the photodetector. The output of the photodetector is coupled to a conventional AM detector 23. The output of the AM detector is filtered by a conventional high-pass filter 24 and coupled to a display device 25, which in one embodiment is a strip chart recorder. This recorder is coupled to a dead reckoning track computer 26 which feeds the display device with information concerning the X and Y coordinates of the helicopter or aircraft. This plot is displayed conventionally as the DRT of the aircraft. Superimposed on this dead reckoning track is an amplitude-modulated signal from the particular module which is being overflown whenever the module detects acoustic subsurface radiation. Depending on the number of modules deployed at any given time, accurate location of the subsurface acoustic force may then be read off directly from the display.

The present system thus provides unusual sensitivity to hydroacoustic radiation because of the phase-modulated split beam optics and the monocrystalline diaphragm combination. The phase-modulated signal is conveniently converted to amplitude modulation which not only maintains this sensitivity but allows processing by simple inexpensive AM equipment. This system has the further significant advantage that the multiplicity of hydrophones deployed do not require an internal power supply and as such have a relatively long lifetime.

What is claimed is:

1. Apparatus for detecting acoustic signals propagating beneath the surface of a fluid medium comprising:
    a housing adapted to float at the surface of said fluid medium;
    an acoustic signal detector positioned in said housing with its sensing element in communication with said fluid medium;
    an optical system accommodated within said housing and adapted to be illuminated with a laser beam,
       said optical system including means for directing a portion of said laser beam over a first optical path of fixed length and thereafter redirecting said portion back along the path of said laser beam and for directing another portion of said laser beam over a second optical path whose length varies in response to the amplitude of any acoustic signal detected by said sensing element and thereafter redirecting said last-mentioned portion back along the path of said laser beam such that both redirected portions of said beam interact because of their colinear orientation to produce a modulated return beam whenever acoustic energy is detected by said sensing element.

2. Apparatus for detecting acoustic signals present in a fluid medium comprising, in combination,
    a housing adapted to float at the free surface of said fluid medium;
    an acoustic signal detector accommodated within said housing with its sensing element adapted to receive acoustic signals present in the surrounding fluid medium,
       said sensing element having one surface thereof which is light reflecting and which is displaced in accordance with the amplitude of said received acoustic signals;
    a wide-angle lens supported by said housing at a location which is above the free surface of said fluid medium, said wide-angle lens when illuminated with a
       monochromatic beam of light originating at a remote laser focusing said beam on said light reflective surface; and
    optical means accommodated within said housing for directing a portion of said beam over a path of a predetermined fixed length and for thereafter combining said portion with the light beam reflected from said reflecting surface, the resulting beam having an amplitude which varies in accordance with the detected acoustic signals,
       this resulting beam thereafter proceeding through said wide-angle lens toward a remote detecting location.

3. A system for detecting at a remote location acoustic signals propagating beneath the surface of a fluid medium comprising, in combination,
    a housing floating on the surface of said fluid medium;
    an acoustic signal detector accommodated within said floating housing with its sensing element adapted to receive acoustic signals present in the surrounding fluid medium;
    a laser located at said remote location and adapted to illuminate an exposed area of said housing with a monochromatic beam of light;
    means within said housing for splitting said monochromatic beam of light and for directing one portion thereof over a first optical path which is of a fixed length and for directing another portion thereof over a second path whose length varies in accordance with the magnitude of any acoustic signals detected by said signal acoustic detector,
       said last-mentioned means also operating to thereafter recombine said portions of said split beam and to redirect the beam resulting therefrom back towards said remote location; and
    means at said remote location for detecting any amplitude modulation of the returning beam thereby to ascertain the nature of any acoustic signals propagating in said fluid medium in the vicinity of said housing.

4. In an arrangement as defined in claim 3 wherein said acoustic signal detector includes a thin, monocrystalline diaphragm with one planar surface thereof reflective to light.

5. In an arrangement as defined in claim 3 wherein a wide-angle lens is mounted on an exposed surface of said housing so as to focus any incoming light into the interior of said housing.